United States Patent
Shinohara

(10) Patent No.: US 7,463,424 B2
(45) Date of Patent: Dec. 9, 2008

(54) WIDE CONVERTER LENS AND IMAGE PICKUP APPARATUS EQUIPPED WITH THE WIDE CONVERTER LENS

(75) Inventor: Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/781,852

(22) Filed: Jul. 23, 2007

(65) Prior Publication Data

US 2008/0024881 A1    Jan. 31, 2008

(30) Foreign Application Priority Data

Jul. 25, 2006    (JP)    ............................. 2006-201772

(51) Int. Cl.
*G02B 15/02*    (2006.01)
(52) U.S. Cl. ...................... 359/673; 359/672
(58) Field of Classification Search ................. 359/672, 359/673
See application file for complete search history.

(56) References Cited

U.S. PATENT DOCUMENTS

| | | | |
|---|---|---|---|
| 2,854,891 A | 10/1958 | Schade | |
| 6,097,547 A * | 8/2000 | Ogata et al. | 359/673 |
| 6,373,638 B1 * | 4/2002 | Kohno | 359/675 |
| 6,400,515 B1 * | 6/2002 | Kohno | 359/675 |
| 6,449,100 B2 * | 9/2002 | Nakazawa et al. | 359/673 |
| 6,504,655 B2 * | 1/2003 | Shibayama | 359/673 |
| 6,542,310 B2 * | 4/2003 | Baba | 359/672 |
| 6,583,939 B2 * | 6/2003 | Yoshikawa et al. | 359/673 |
| 7,170,689 B2 * | 1/2007 | Miyazawa | 359/672 |

FOREIGN PATENT DOCUMENTS

JP    2000-241700    9/2000

\* cited by examiner

*Primary Examiner*—David N Spector
(74) *Attorney, Agent, or Firm*—Canon USA Inc I.P. Div

(57) ABSTRACT

A compact wide converter lens having a small front-lens diameter. When attached to an object side of a main lens system, the wide converter lens provides reduced degradation of aberrations to achieve high optical performance. The wide converter lens includes a first negative lens element disposed most proximate to the object side and whose object-side surface is concave, a second positive lens element disposed at an image side of the first lens element, and a third negative lens element disposed at an image side of the second lens element. The following conditions are satisfied:

$$1.0 < (r1-r2)/(r1+r2) < 2.0$$

$$-40 < f1/D < -7,$$

wherein r1 and r2 respectively represent curvature radii of the object-side and image-side surfaces of the first lens element, f1 represents a focal length of the first lens element, and D represents a spatial distance between the second and third lens elements.

11 Claims, 10 Drawing Sheets

WIDE CONVERTER LENS AND IMAGE PICKUP APPARATUS EQUIPPED WITH THE WIDE CONVERTER LENS

BACKGROUND OF THE INVENTION

1. Field of the Invention

The present invention relates to wide converter lenses attached to an object side of imaging lenses (main lens systems) used in, for example, digital still cameras, video cameras, or broadcasting cameras, and particularly, to a wide converter lens that shortens the focal length of the entire system relative to the original focal length of the main lens system.

2. Description of the Related Art

As a general technique for shifting the focal length of a main lens system (imaging lenses) towards the wide angle side, or in other words, shortening the focal length, a front-type wide converter lens is known. A wide converter lens of this type is an afocal lens attached to an object side of a main lens system. This technique is advantageous in that the F-number of the main lens system does not change even when the focal length is shifted.

U.S. Pat. No. 2,854,891 discloses an example of a front-type wide converter lens having a three lens structure. Specifically, in this example, the wide converter lens has a first lens element of negative refractive power, a second lens element of negative refractive power, and a third lens element of positive refractive power that are bonded to each other in that order from the object side.

In recent years, there has been disclosed a wide converter lens of a four lens structure for achieving better optical performance, such as an example described in Japanese Patent Laid-Open No. 2000-241700. A wide converter lens of such a four lens structure includes a first lens element of negative refractive power, a second lens element of positive refractive power, a third lens element of negative refractive power, and a fourth lens element of positive refractive power.

Typically, a wide converter lens is constituted by a small number of lens elements to achieve compactness. When such a typical wide converter lens is attached to an object side of a main lens system, the curvature of field, the distortion aberration, and the chromatic aberration of magnification change significantly due to optical characteristics in which off-axis rays transmit through peripheral areas of the lens. On the other hand, when a wide converter lens is attached to a zoom lens, the distortion aberration and the curvature of field often increase at the wide-angle end.

If an object-side lens surface is given a strong positive refractive power to reduce the distortion aberration and the curvature of field at the wide-angle end, the spherical aberration will increase in the negative direction at the telephoto end, thus making it difficult to attain high quality images over the entire zooming range.

The wide converter lens disclosed in U.S. Pat. No. 2,854,891 is detachably attached to a zoom lens and has a three lens structure with a lens element of negative refractive power, a lens element of negative refractive power, and a lens element of positive refractive power arranged in that order from the object side. However, this wide converter lens is problematic in that a large distortion aberration occurs at the wide-angle end and that the chromatic aberration of magnification tends to become large over the entire zooming range.

In addition, when the afocal magnification is reduced, the power of the lens increases entirely. This unfavorably tends to cause an image plane variation to become greater when zooming.

On the other hand, when the wide converter lens of the four lens structure disclosed in Japanese Patent Laid-Open No. 2000-241700 is attached to a zoom lens, improvements in meridional image plane and chromatic aberration of magnification are achieved at the wide-angle end.

However, because the second lens element and the third lens element are separated from each other by a large distance to reduce slanting of a meridional image plane, the effective front-lens diameter is increased, causing an increase in size of the entire lens system.

Consequently, with regard to a wide converter lens attached to a zoom lens, it is desired that an increase in the effective front-lens diameter be prevented, that the entire lens system be reduced in size, and that a high image quality be attained.

SUMMARY OF THE INVENTION

The present invention is directed to a wide converter lens and an image pickup apparatus incorporating the same. According to an aspect of the present invention, a wide converter lens is provided, which is attached to an object side of a main lens system. The wide converter lens includes a first lens element having negative refractive power and whose object-side surface is concave, a second lens element having positive refractive power, and a third lens element having negative refractive power. The first lens element is disposed most proximate to the object side. The second and third lens elements are disposed at an image side of the first lens element. The following conditions are satisfied:

$$1.0 < (r1-r2)/(r1+r2) < 2.0$$

$$-40 < f1/D < -7,$$

wherein r1 and r2 respectively represent curvature radii of the object-side surface and an image-side surface of the first lens element, f1 represents a focal length of the first lens element, and D represents a spatial distance between the second lens element and the third lens element.

According to another aspect of the present invention, a wide converter lens is provided, which is attached to an object side of a main lens system. The wide converter lens includes a first negative lens element whose object-side surface is concave; a second positive lens element having opposing convex surfaces; a third negative lens element having opposing concave surfaces; and a fourth positive lens element having opposing convex surfaces. The first to fourth lens elements are disposed in that order from the object side towards an image side. The following conditions are satisfied:

$$1.0 < (r1-r2)/(r1+r2) < 2.0$$

$$-40 < f1/D < -7,$$

wherein r1 and r2 respectively represent curvature radii of the object-side surface and an image-side surface of the first lens element, f1 represents a focal length of the first lens element, and D represents a spatial distance between the second lens element and the third lens element.

The present invention provides a wide converter lens having a small front-lens diameter and whose entire lens system is compact. In addition, when the wide converter lens is attached to an object side of a main lens system, the wide converter lens provides reduced degradation of aberrations in the entire system to achieve high optical performance. The present invention also provides an image pickup apparatus equipped with the aforementioned wide converter lens.

Further features of the present invention will become apparent from the following description of exemplary embodiments with reference to the attached drawings.

DESCRIPTION OF THE EMBODIMENTS

Figure 1:
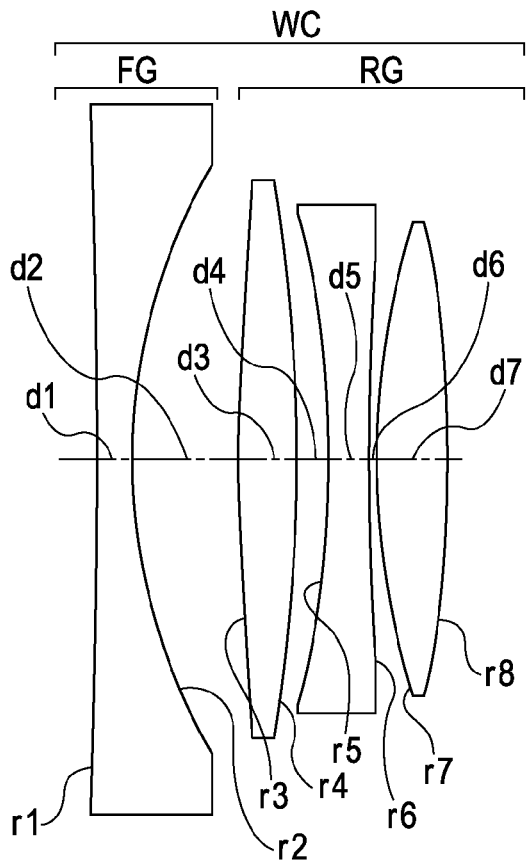
FIG. 1 is a cross-sectional view of a wide converter lens according to a first embodiment of the present invention.

A wide converter lens, a photographic system having the wide converter lens attached to a main lens system thereof, and an image pickup apparatus equipped with the photographic system according to exemplary embodiments of the present invention will now be described with reference to the drawings.

In the cross-sectional diagrams, reference character WC denotes a wide converter lens, and MS denotes a main lens system. In these cross-sectional diagrams, the left side is the object side, whereas the right side is the image side.

In the aberration diagrams, ΔM denotes a meridional image plane, ΔS denotes a sagittal image plane, and g-line denotes a chromatic aberration of magnification. Reference character fno denotes an F-number. Reference symbol ω denotes a half angle of view.

The wide converter lens WC in each of embodiments according to the present invention is attached to the object side of the main lens system MS and is shiftable in a direction for reducing the focal length of the entire system relative to the focal length at the time when the main lens system MS is used singularly.

The wide converter lens WC is an afocal system constituted by a front group and a rear group. The front group includes an arbitrary number of lens elements counted from the object side and has negative refractive power. On the other hand, the rear group includes all of the remaining lens elements at the image side of the front group and has positive refractive power.

The wide converter lens WC includes a first lens element of negative refractive power disposed most proximate to the object side and whose object-side surface is concave, a second lens element of positive refractive power, and a third lens element of negative refractive power, both the second and third lens elements being disposed on the image side of the first lens element.

Specifically, in the following order from the object side towards the image side, the wide converter lens WC includes the first negative lens element with a concave surface on its object side, the second positive lens element with convex surfaces on both sides thereof, the third negative lens element with concave surfaces on both sides thereof, and a fourth negative lens element with convex surfaces on both sides thereof.

In each of the embodiments, the first lens element is given a concave surface on its object side so that a large spatial distance generally required between the second lens element and the third lens element for correcting a meridional image plane can be reduced. This minimizes the increase in front-lens diameter. Although the second lens element has convex surfaces on both sides thereof, the second lens element is not limited to this shape. Other shapes are permissible as long as the second lens element has positive refractive power. Likewise, although the third lens element has concave surfaces on both sides thereof, other shapes are permissible as long as the third lens element has negative refractive power. Furthermore, although the fourth lens element has convex surfaces on both sides thereof, the fourth lens element is not limited to this shape. Other shapes are permissible as long as the fourth lens element has positive refractive power.

By giving the first to fourth lens elements the shapes described above, the occurrence of aberrations is low when these lens elements are attached to the main lens system. Thus, high optical performance can be attained over the entire zooming range.

If an area with the largest spatial distance is viewed as a boundary, the wide converter lens WC can be treated as an afocal system having a front group of negative refractive power constituted by the first lens element and a rear group of positive refractive power constituted by the second positive lens element, the third negative lens element, and the fourth positive lens element.

Alternatively, the wide converter lens WC can be treated as an afocal system having a front group of negative refractive power constituted by the first and second lens elements and a rear group of positive refractive power constituted by the third and fourth lens elements. As a further alternative, the wide converter lens WC can be treated as an afocal system having a front group of negative refractive power constituted by the first, second, and third lens elements and a rear group of positive refractive power constituted by the fourth lens element.

With regard to the wide converter lens WC, the following conditions are satisfied:

$$1.0 < (r1-r2)/(r1+r2) < 2.0 \quad (1)$$

$$-40 < f1/D < -7 \quad (2)$$

where r1 and r2 respectively represent the curvature radii of the object-side surface and the image-side surface of the first lens element; f1 represents the focal length of the first lens element; and D represents the spatial distance between the second lens element and the third lens element. In addition, the following condition is also satisfied:

$$1.5 < N_{d1} < 1.6 \quad (3)$$

where $N_{d1}$ represents the refractive index of the material used for the first lens element.

The conditional formula (1) is for determining the shape of the first lens element and is used for balancing out the compensation for distortion aberration at the wide-angle end and spherical aberration at the telephoto end. When a value exceeds the upper limit of the conditional formula (1), the object-side lens surface has sharp curvature, which implies that the distortion aberration at the wide-angle end becomes greater. On the other hand, when a value falls below the lower limit of the conditional formula (1), the curvature of the lens surface is gentle. For this reason, even though the distortion aberration at the wide-angle end may be reduced, the meridional image plane becomes larger in the lower direction, leading to deterioration in the image-formation performance.

The conditional formula (2) is for limiting the spatial distance between the second lens element and the third lens element to prevent size increase of the entire lens system. If the distance value exceeds the upper limit of the conditional formula (2), it may be easier to correct the meridional image plane at the wide-angle end, but the entire lens system will be increased in size. On the other hand, when the distance value falls below the lower limit of the conditional formula (2), even though the lens system may be smaller in size, the power of the lens surfaces is increased, causing high-order aberrations to occur frequently. This makes it difficult to correct the meridional image plane at the wide-angle end while simultaneously compensating for distortion aberration at the wide-angle end or spherical aberration at the telephoto end.

The conditional formula (3) relates to the refractive index of the material used for the first lens element, and is mainly a condition for properly compensating for aberrations occurring in the first lens element. When the refractive index value exceeds the upper limit of the conditional formula (3), the lens surface must be given gentle curvature to minimize the occurrence of distortion aberration at the wide-angle end. This makes it difficult to compensate for spherical aberration at the telephoto end. On the other hand, when the refractive index value falls below the lower limit of the conditional formula (3), the lens surface must be given sharp curvature to correct the meridional image plane at the wide-angle end. This is not favorable since the occurrence of distortion aberration will increase.

In view of achieving aberration compensation in each of the embodiments, the numerical ranges in the conditional formulas (1) to (3) can be set as follows:

$$1.1 < (r1-r2)/(r1+r2) < 1.8 \quad (1a)$$

$$-35 < f1/D < -10 \quad (2a)$$

$$1.51 < N_{d1} < 1.59 \quad (3a).$$

Also, the conditional formulas (1) to (3) can be set as follows:

$$1.3 < (r1-r2)/(r1+r2) < 1.75 \quad (1b)$$

$$-35 < f1/D < -12 \quad (2b)$$

$$1.51 < N_{d1} < 1.520 \quad (3b).$$

Accordingly, by choosing the appropriate lens shape and glass material for the first negative lens element disposed most proximate to the object side, the curvature of meridional image plane at the wide-angle end can be appropriately corrected without having to increase the size of the entire lens system, thereby reducing an image plane variation and a variation in chromatic aberration of magnification when performing a zooming operation.

Figure 2:
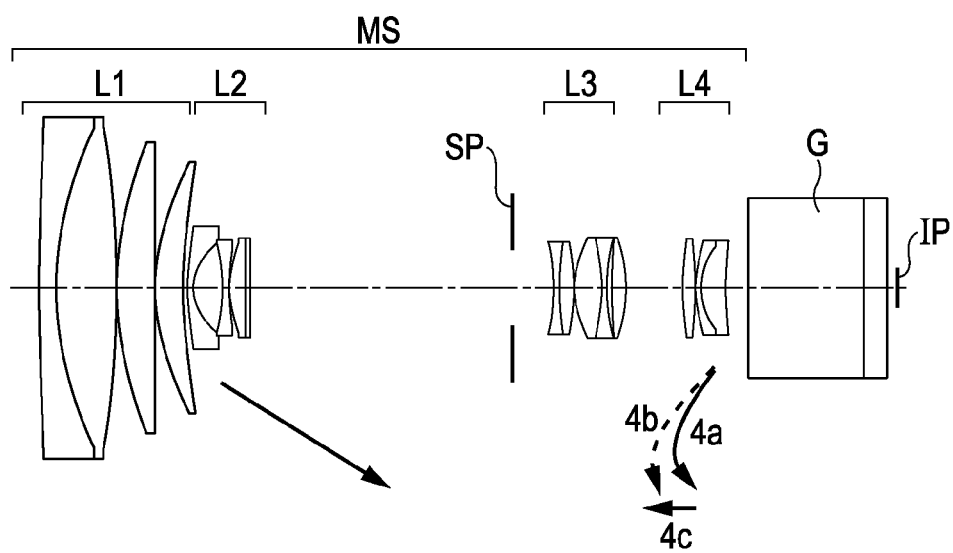
FIG. 2 is a cross-sectional view of a main lens system having a zooming function.
Figure 3:
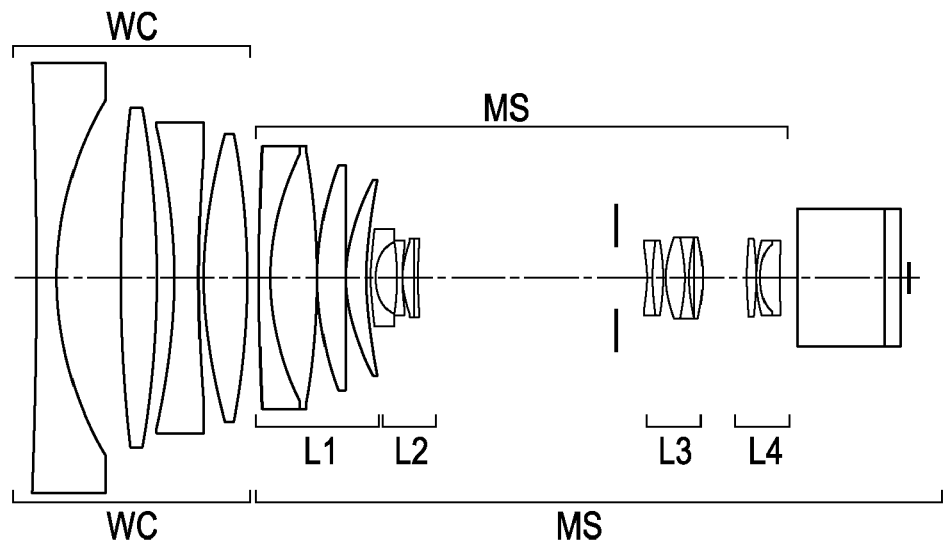
FIG. 3 is a cross-sectional view of the wide converter lens according to the first embodiment and the main lens system.
Figure 4:
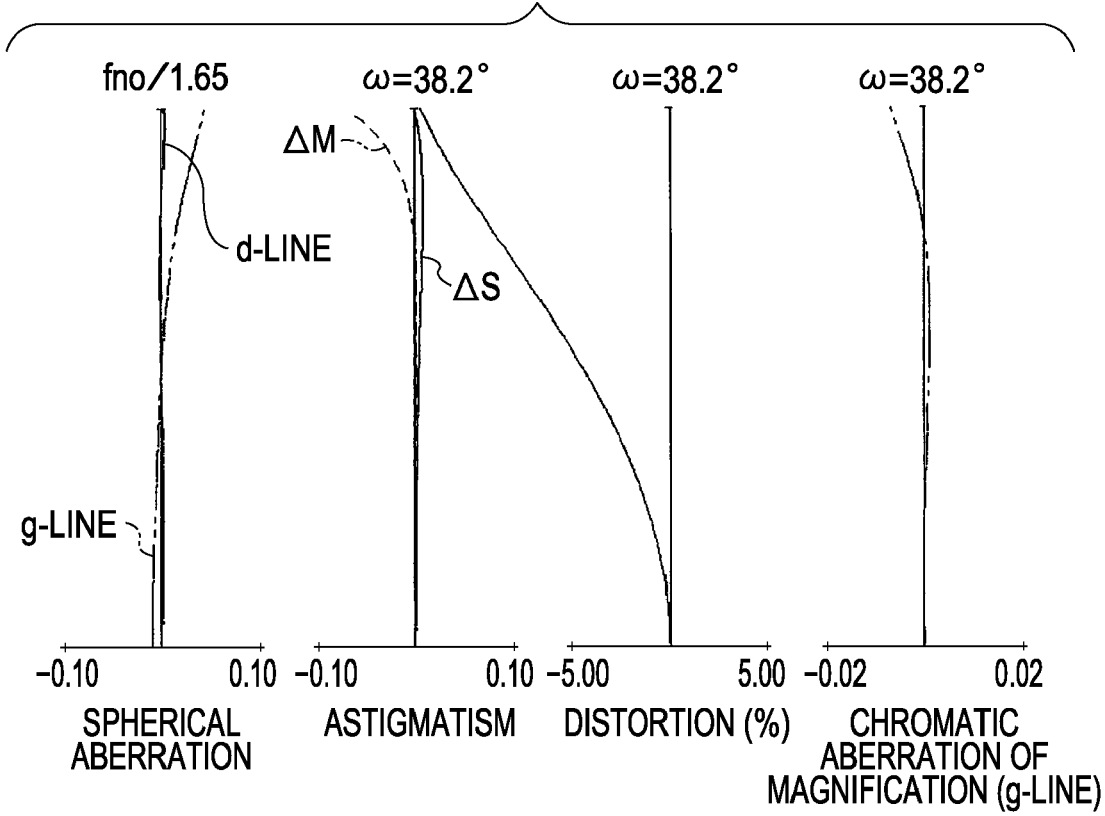
FIG. 4 is an aberration diagram of the wide converter lens according to the first embodiment and the main lens system at a wide-angle end.
Figure 5:
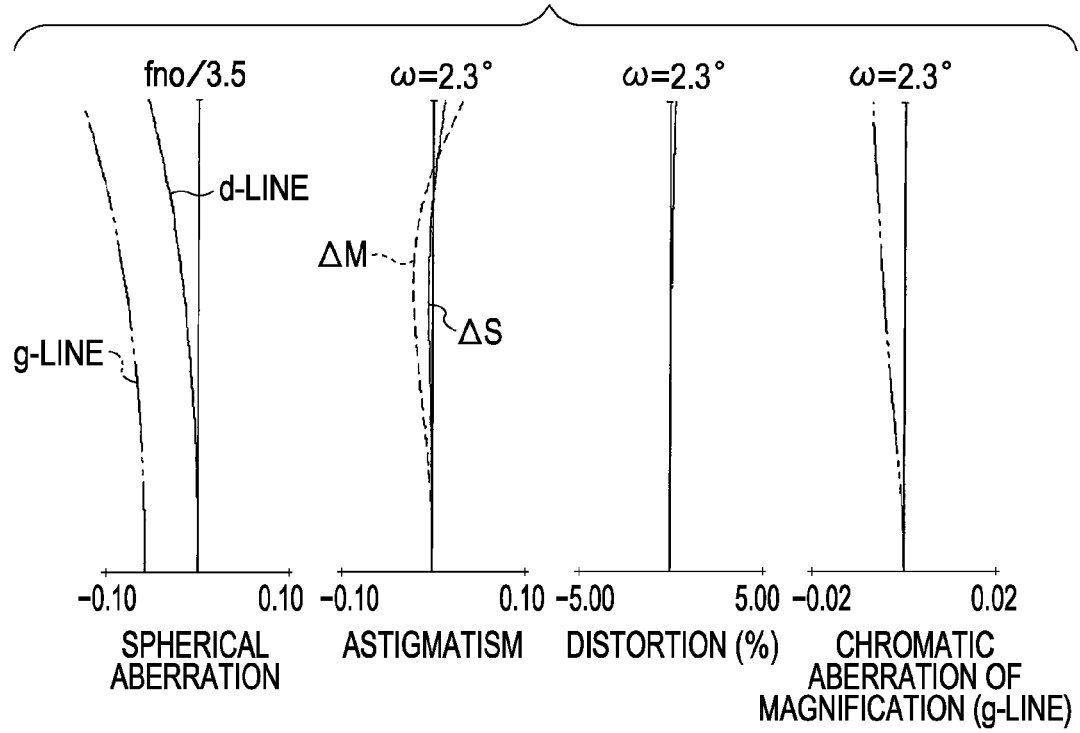
FIG. 5 is an aberration diagram of the wide converter lens according to the first embodiment and the main lens system at a telephoto end.
Figure 6:
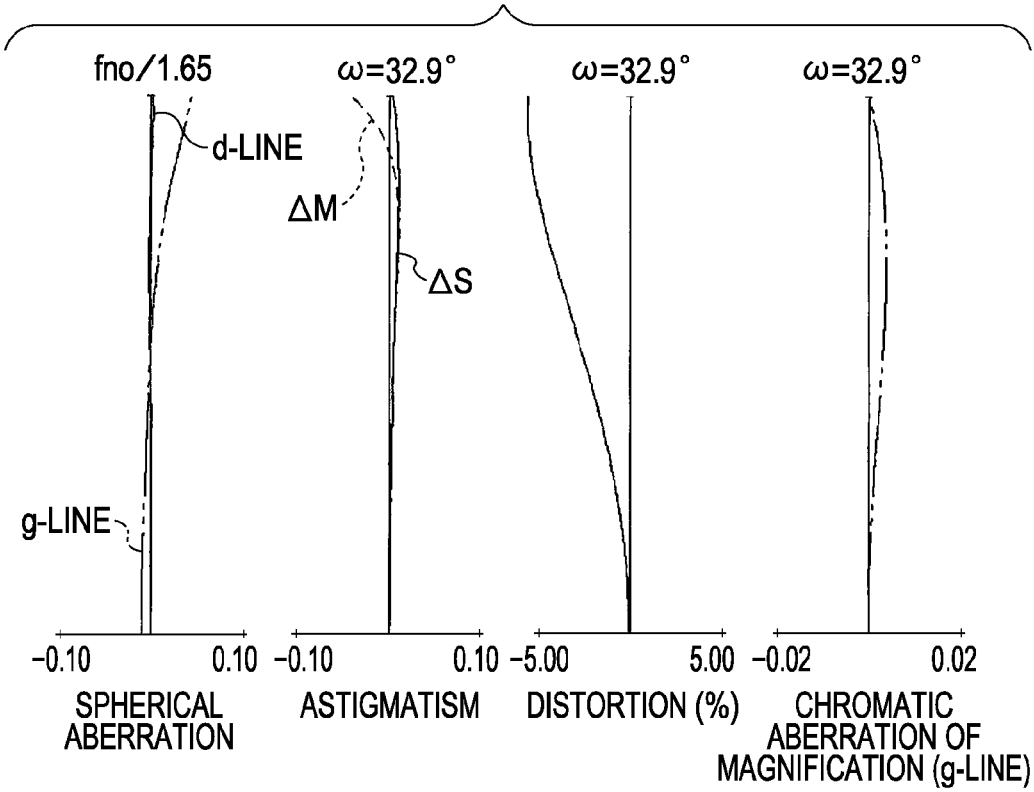
FIG. 6 is an aberration diagram corresponding to a zooming position of the main lens system at the wide-angle end.
Figure 7:
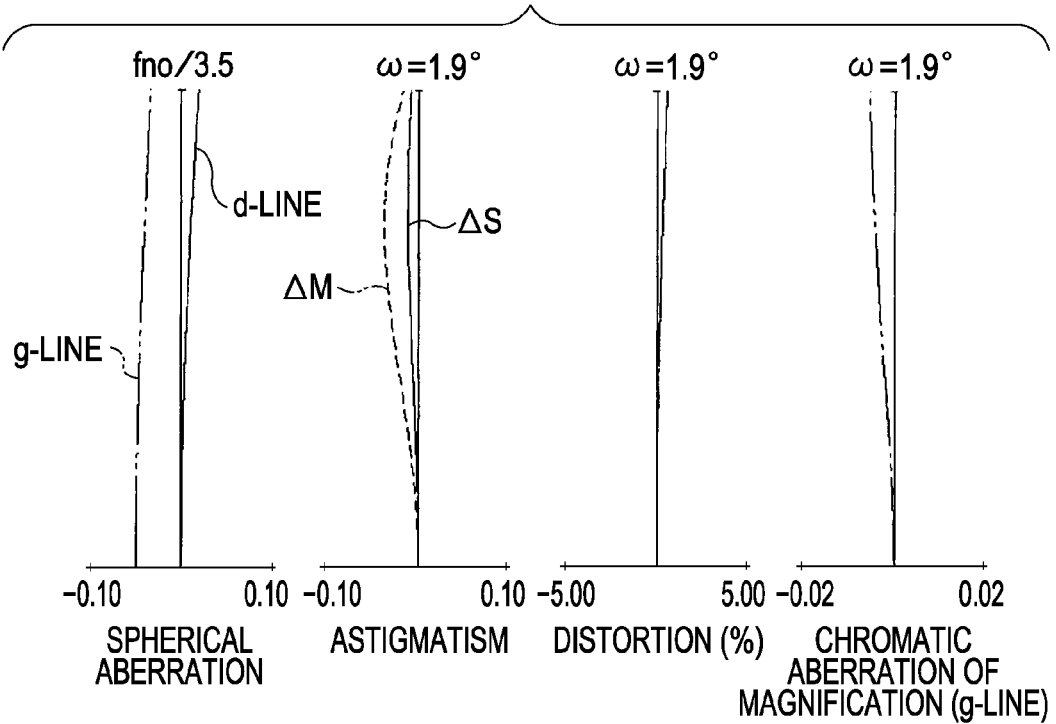
FIG. 7 is an aberration diagram corresponding to a zooming position of the main lens system at the telephoto end.
Figure 8:
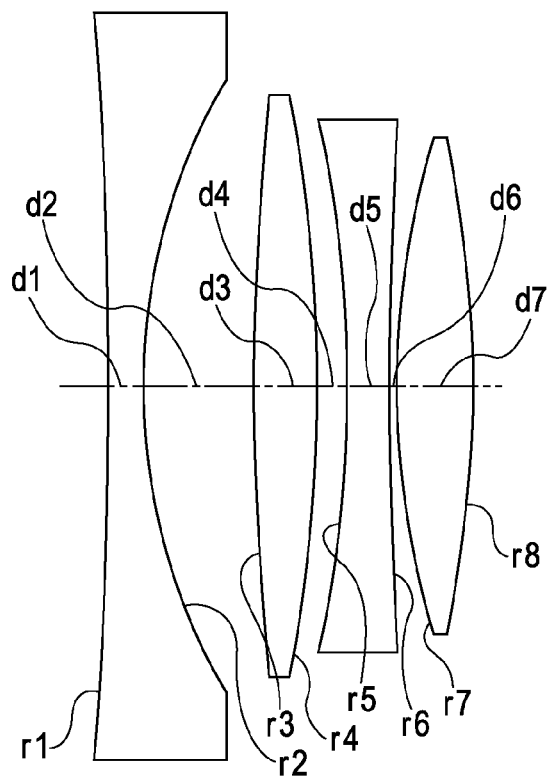
FIG. 8 is a cross-sectional view of a wide converter lens according to a second embodiment of the present invention.
Figure 9:
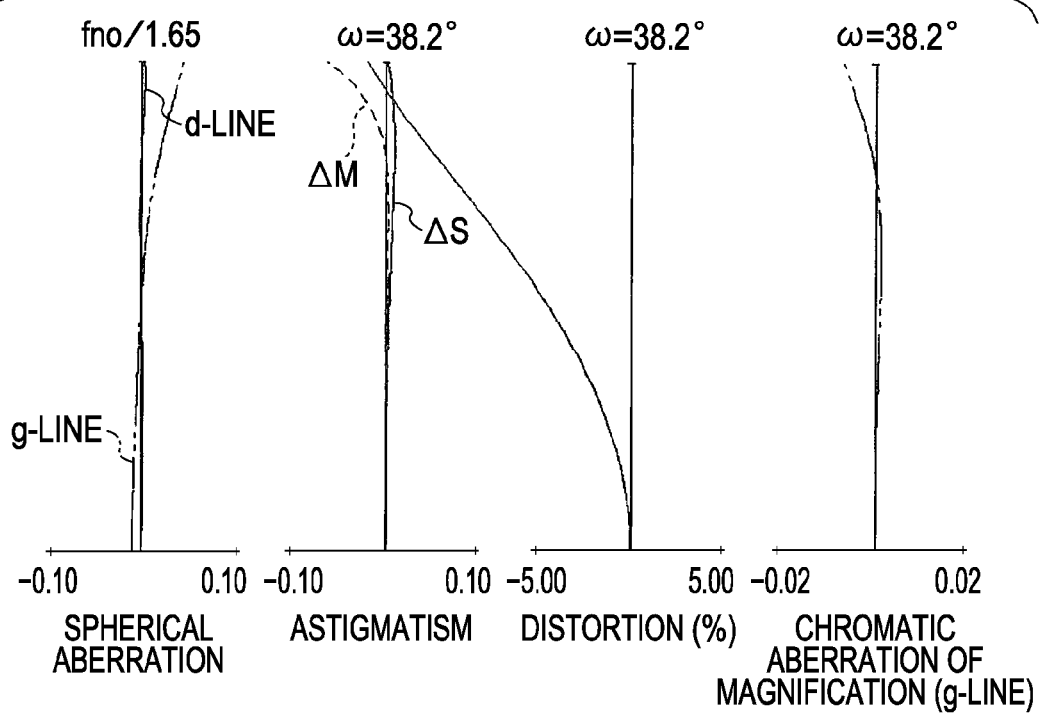
FIG. 9 is an aberration diagram of the wide converter lens according to the second embodiment and the main lens system at a wide-angle end.
Figure 10:
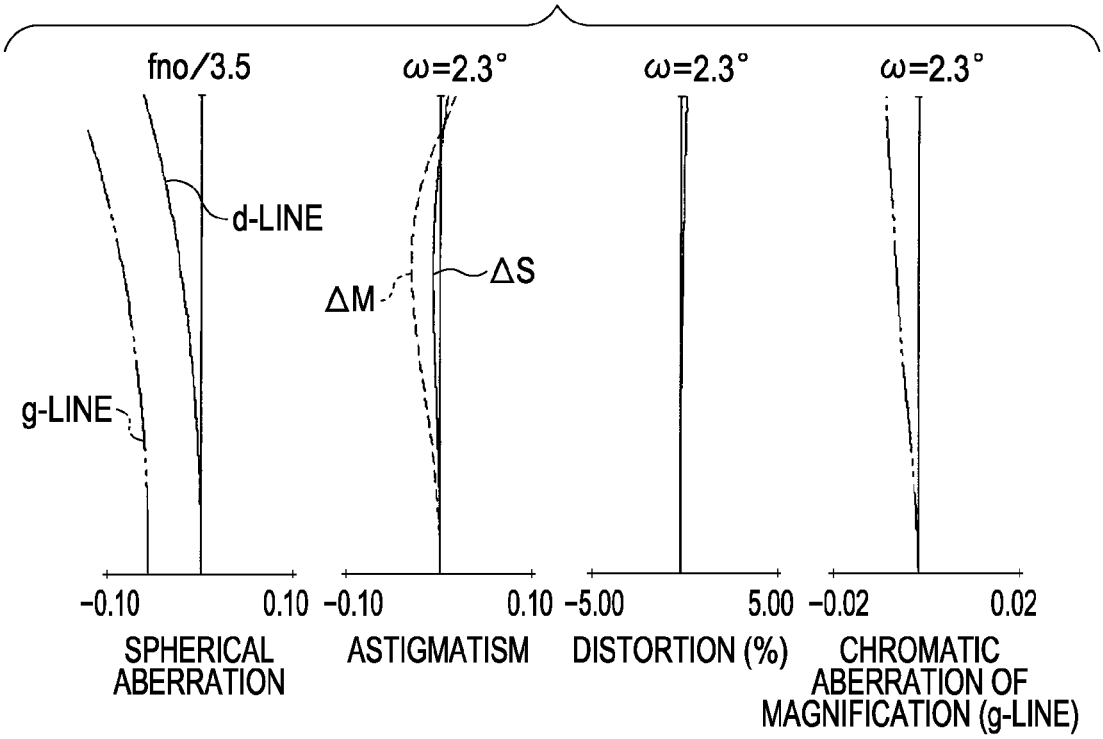
FIG. 10 is an aberration diagram of the wide converter lens according to the second embodiment and the main lens system at a telephoto end.
Figure 11:
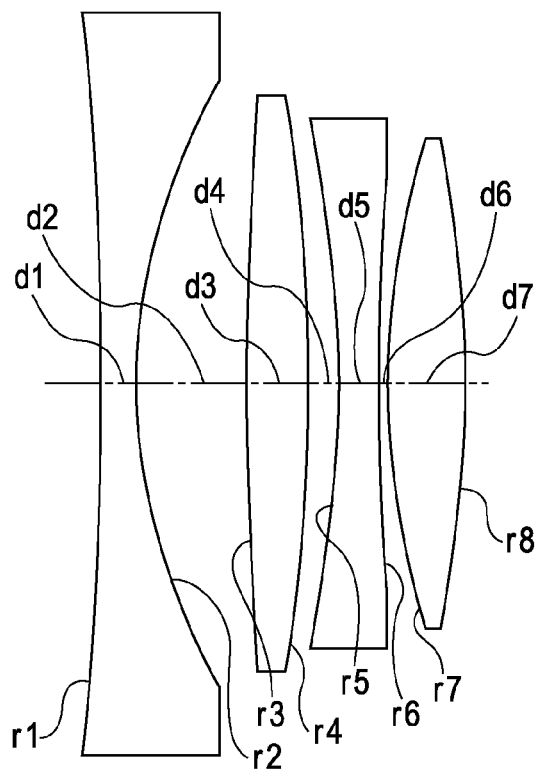
FIG. 11 is a cross-sectional view of a wide converter lens according to a third embodiment of the present invention.
Figure 12:
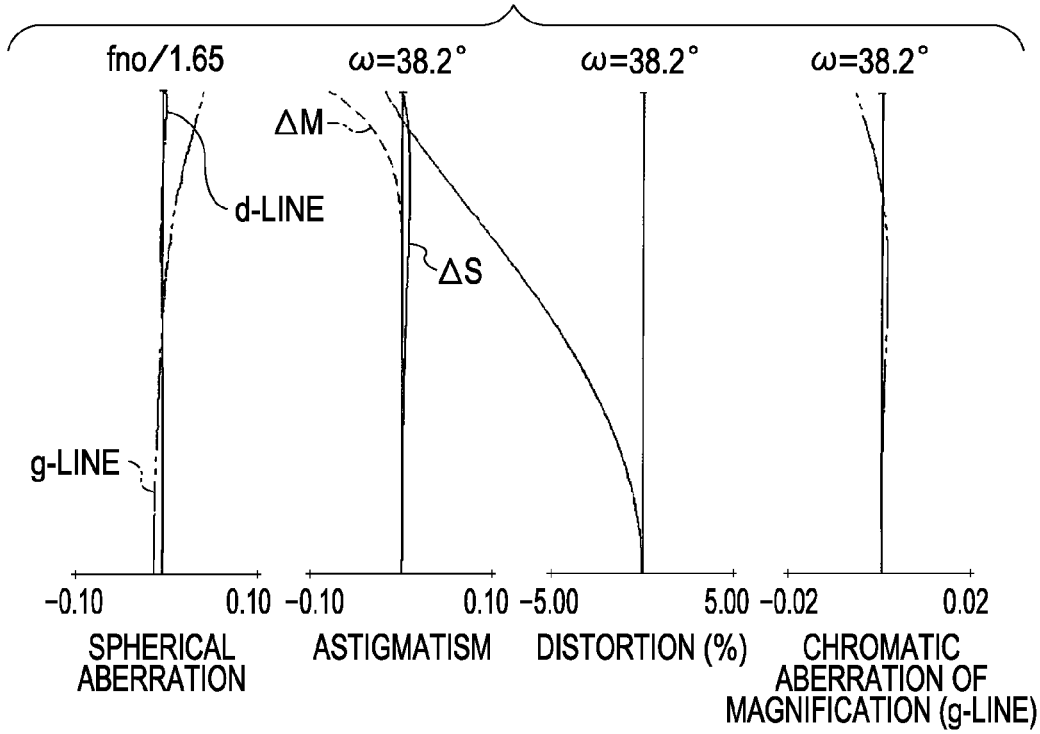
FIG. 12 is an aberration diagram of the wide converter lens according to the third embodiment and the main lens system at a wide-angle end.
Figure 13:
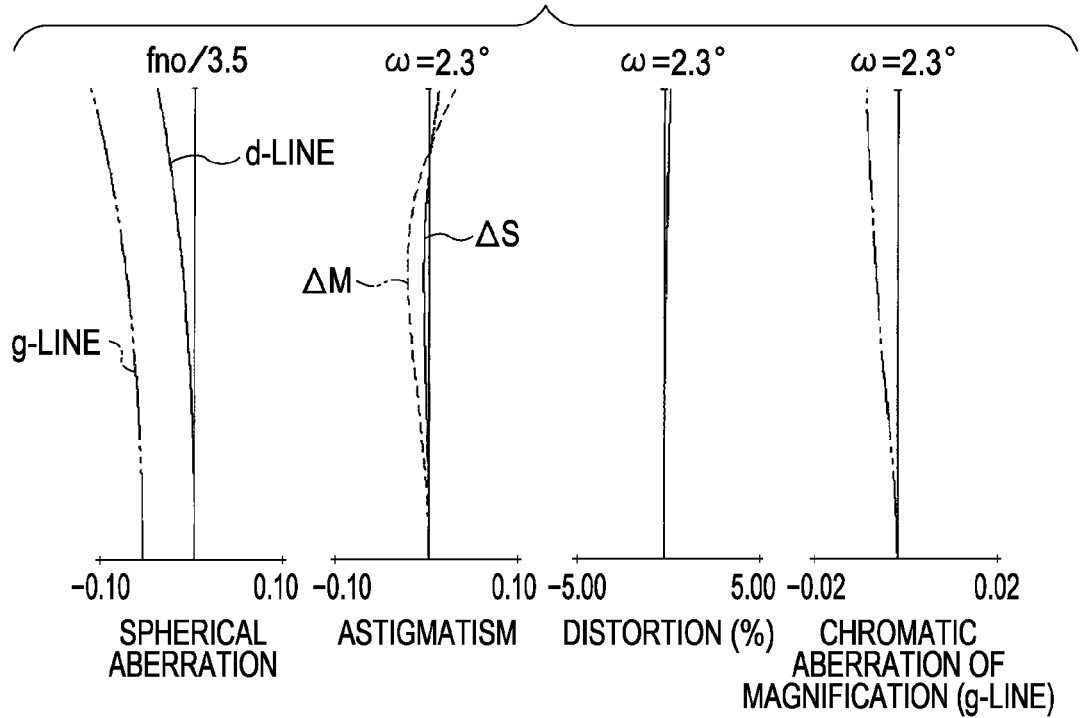
FIG. 13 is an aberration diagram of the wide converter lens according to the third embodiment and the main lens system at a telephoto end.
Figure 14:
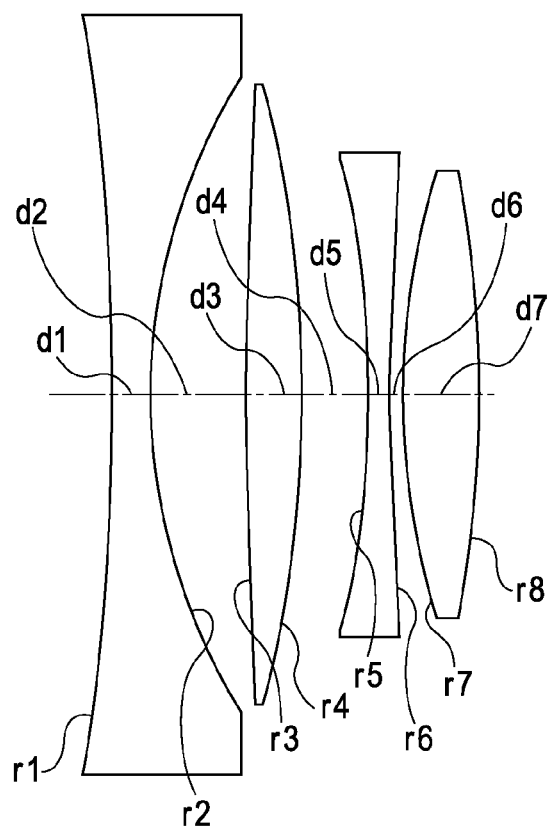
FIG. 14 is a cross-sectional view of a wide converter lens according to a fourth embodiment of the present invention.
Figure 15:
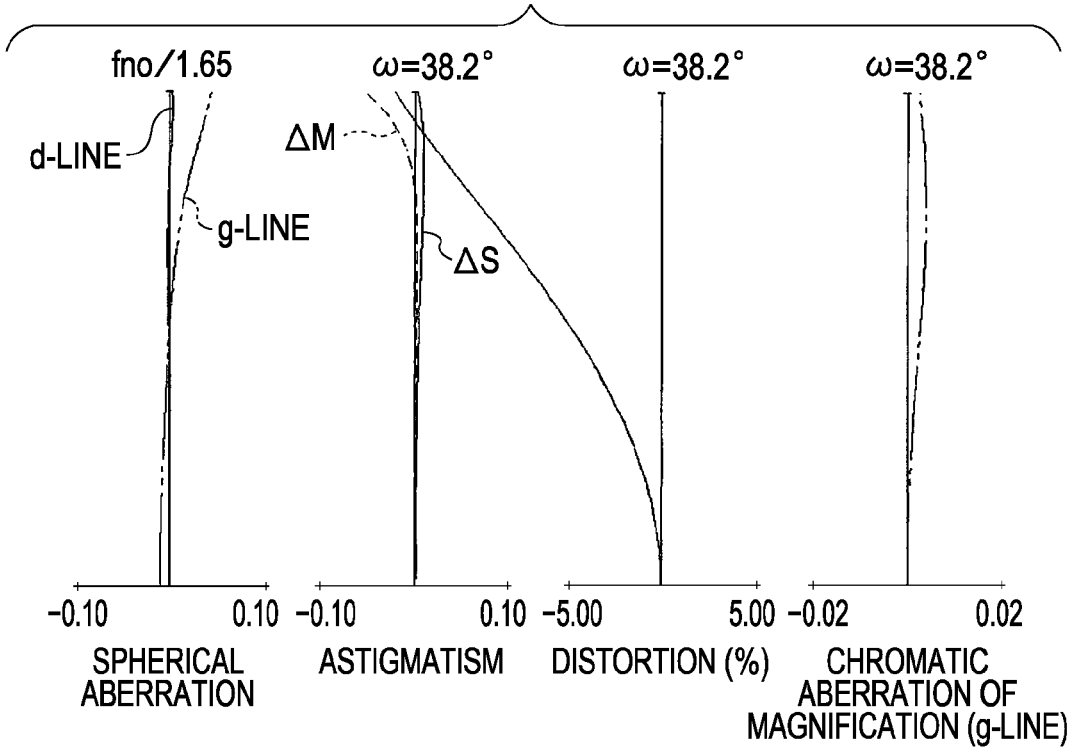
FIG. 15 is an aberration diagram of the wide converter lens according to the fourth embodiment and the main lens system at a wide-angle end.
Figure 16:
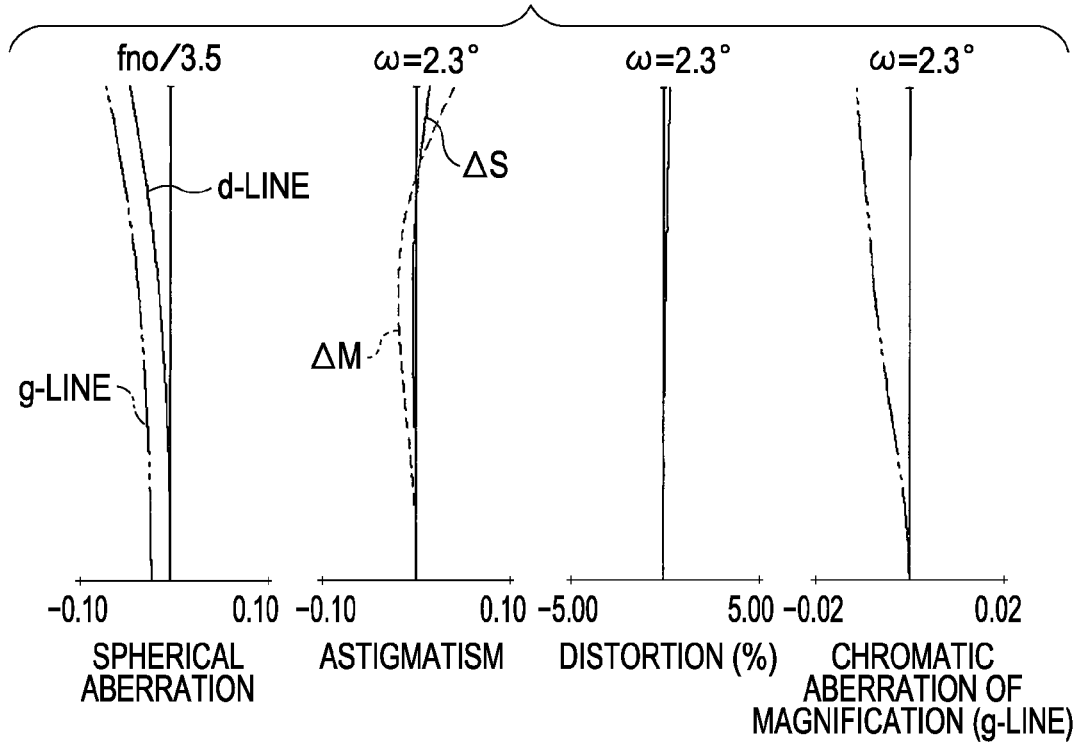
FIG. 16 is an aberration diagram of the wide converter lens according to the fourth embodiment and the main lens system at a telephoto end.
Figure 17:
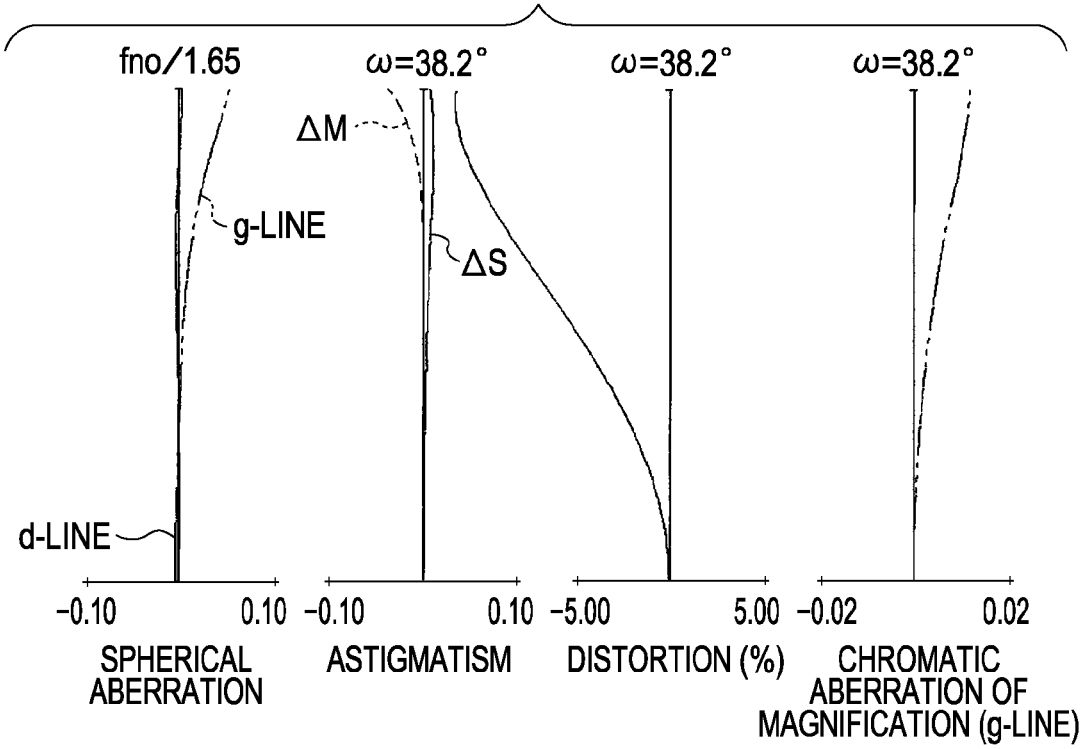
FIG. 17 is an aberration diagram corresponding to a wide-angle end obtained when a wide converter lens of related art is attached to the main lens system.
Figure 18:
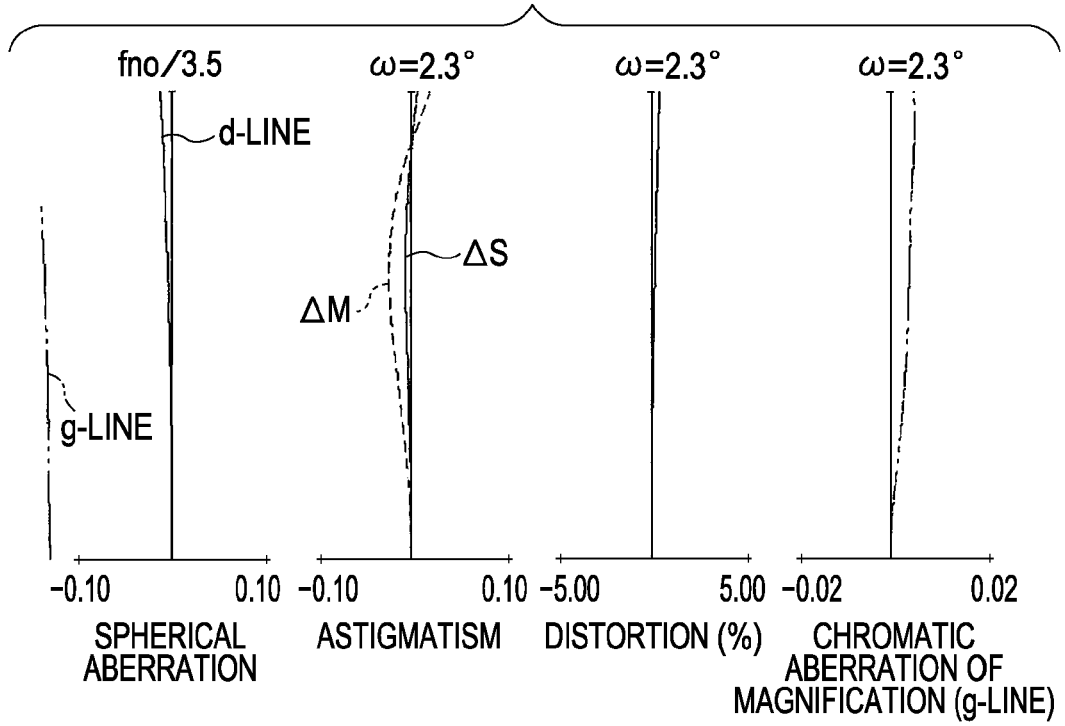
FIG. 18 is an aberration diagram corresponding to a telephoto end obtained when the wide converter lens of related art is attached to the main lens system.

FIGS. 17 and 18 illustrate aberration diagrams at the wide-angle end and the telephoto end in a case where a wide converter lens according to a numerical example disclosed in Japanese Patent Laid-Open No. 2000-241700 is attached to the object side of the main lens system shown in FIG. 2.

In the embodiments according to the present invention, the front-lens diameter is smaller than that of the wide converter lens disclosed in Japanese Patent Laid-Open No. 2000-241700, and the entire lens system of the embodiments is smaller than that of Japanese Patent Laid-Open No. 2000-241700. Nevertheless, it is apparent from the diagrams that the aberrations in the embodiments of the present invention are compensated equivalently to or better than those in Japanese Patent Laid-Open No. 2000-241700.

In each of the embodiments, the conditions mentioned above are satisfied so that the compensation for aberrations occurring at the wide-angle end and the telephoto end can be balanced out. Accordingly, this achieves a high-performance wide converter lens with less image-quality deterioration over the entire zooming range.

The lens configuration of the main lens system MS shown in FIG. 2 will now be described.

In the cross-sectional view of FIG. 2, reference character L1 denotes a first lens unit having positive refractive power (optical power=reciprocal of the focal length), L2 denotes a second lens unit having negative refractive power, L3 denotes a third lens unit having positive refractive power, and L4 denotes a fourth lens unit having positive refractive power. Reference character SP denotes an aperture stop that is positioned on the object side of the third lens unit L3.

Reference character G denotes an optical block equivalent to an optical filter or a face plate. Reference character IP denotes an image plane. This image plane IP corresponds to an image pickup surface of a solid-state image pickup element (photoelectric conversion element), such as a CCD sensor and a CMOS sensor, when the main lens system MS is used as a photographic optical system in a video camera or a digital camera. If the main lens system MS is used as a photographic optical system in a film camera, the image plane IP corresponds to a film surface.

When performing a zooming operation from a wide-angle end to a telephoto end, the second lens unit L2 is moved towards the image side as shown with an arrow so as to change the magnification. In addition, the fourth lens unit L4 is moved along a locus convex towards the object side so as to compensate for an image plane variation occurring in response to the changing of the magnification.

The fourth lens unit L4 is a rear focusing type which is moved on the light axis to perform focusing. A solid curve line 4a and a dotted curve line 4b indicate loci along which the fourth lens unit L4 can be moved to compensate for image-plane variations occurring in response to changing of the magnification when focused on an infinite-distance object and a close-distance object, respectively.

When focusing from an infinite-distance object to a close-distance object at the telephoto end, the fourth lens unit L4 is moved forward as shown with an arrow 4c.

The first lens unit L1, the third lens unit L3, and the aperture stop SP do not move in the light-axis direction for zooming or focusing, but may be made movable where necessary for aberration compensation.

An embodiment of a video camera will be described below with reference to FIG. 19. The video camera is equipped with a photographic optical system, which includes the main lens system and the wide converter lens according to the present invention attached thereto.

Figure 19:
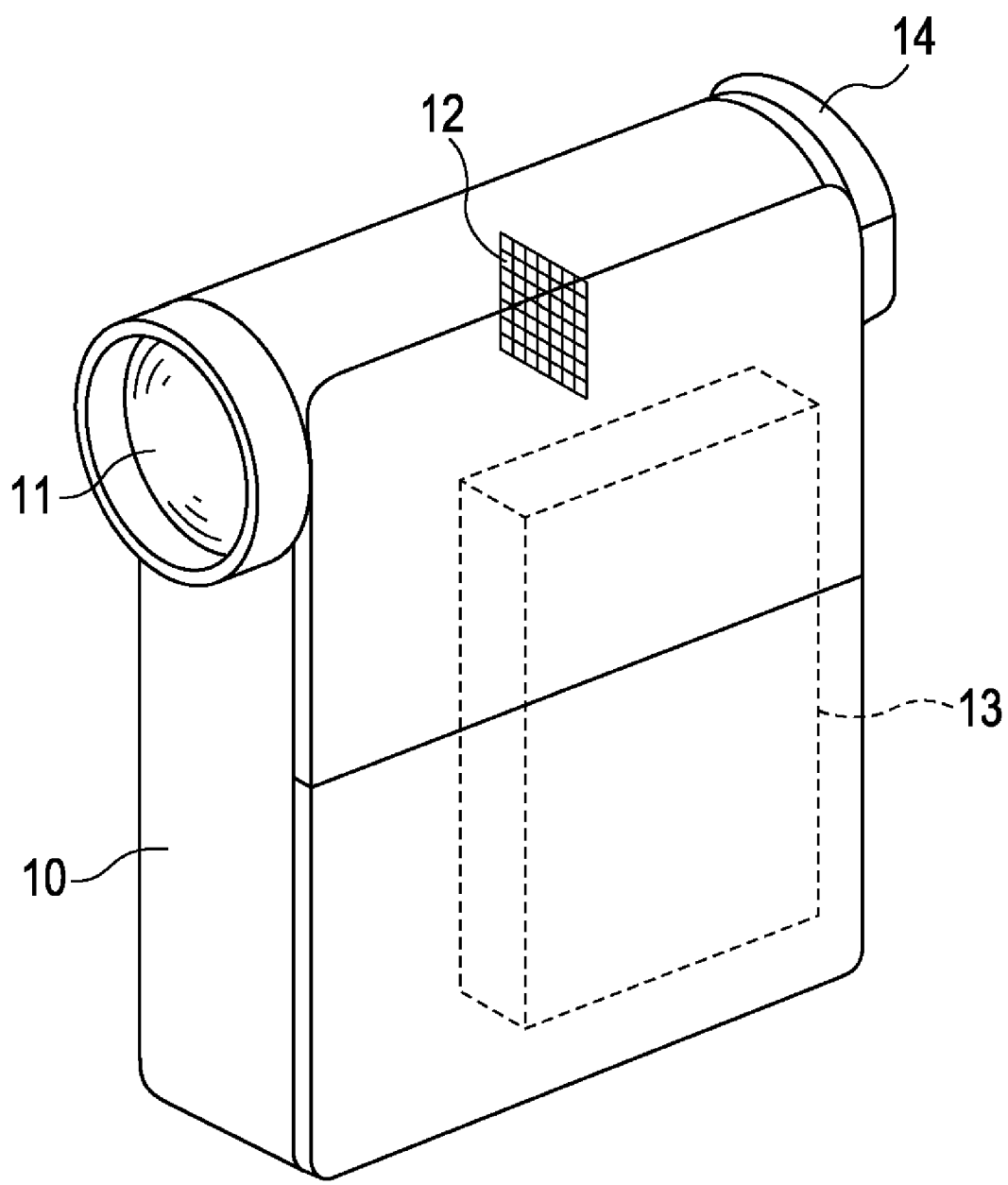
FIG. 19 schematically illustrates an image pickup apparatus according to the present invention.

Referring to FIG. 19, the video camera includes a video camera body 10 and a photographic optical system 11 constituted by the main lens system and the wide converter lens according to the present invention attached thereto. Reference numeral 12 denotes a solid-state image pickup element (photoelectric conversion element), such as a CCD sensor and a CMOS sensor, which optically receives a subject image through the photographic optical system 11. Reference numeral 13 denotes a memory that stores the subject image optically received by the image pickup element 12. Reference numeral 14 denotes a viewfinder for observing the subject image displayed on a display unit (not shown). The display unit is defined by, for example, a liquid crystal panel and displays the subject image formed on the image pickup element 12.

By applying the photographic optical system according to the present invention to an image pickup apparatus such as a video camera, an image pickup apparatus having high optical performance can be achieved.

Numerical examples of the wide converter lens according to the embodiments of the present invention and numerical examples of the main lens system will be described below.

In each numerical example, reference character ri represents the curvature radius of an i-th surface from the object side; di represents the distance between the i-th surface and an (i+1)-th surface from the object side; n represents the refractive index in a d-line of the material used for an i-th lens; and vi represents the Abbe number in the d-line of the material used for the i-th lens.

Furthermore, reference character k represents a conic constant, and reference characters A', B, B', C, C', D, D', E, E', F represent aspherical constants in the third, fourth, fifth, sixth, seventh, eighth, ninth, tenth, eleventh, twelfth orders, respectively. With respect to a surface vertex, if displacement in the light-axis direction at a position corresponding to a height h from the light axis is represented by x, the shape of an aspherical surface is expressed as follows:

$$x=(h2/R)/[1+[1-(1+K)(h/R)^2]^{1/2}]+A'h^3+Bh^4+B'h^5+Ch^6+Ch^7+Dh^8+D'h^9+Eh^{10}+E'h^{11}+Fh^{12}.$$

In this case, R represents the curvature radius, and "e-X" represents "$\times 10^{-x}$". In each of the tables shown below, an aspherical surface is given a star (*) mark to the left of a surface number.

The relationships between the aforementioned conditional formulas and numerical values in the numerical examples are shown in Table 1.

Wide Converter Lens

FIRST NUMERICAL EXAMPLE

| Numerical Values 1 | | | |
|---|---|---|---|
| r1 = −248.477 | d1 = 1.20 | n1 = 1.589130 | v1 = 61.1 |
| r2 = 20.759 | d2 = 3.89 | | |
| r3 = 102.143 | d3 = 2.17 | n2 = 1.805181 | v2 = 25.4 |
| r4 = −53.652 | d4 = 1.07 | | |
| r5 = −37.552 | d5 = 1.47 | n3 = 1.805181 | v3 = 25.4 |
| r6 = 129.163 | d6 = 0.25 | | |
| r7 = 28.929 | d7 = 2.64 | n4 = 1.517417 | v4 = 52.4 |
| r8 = −40.828 | | | |

AFOCAL MAGNIFICATION 0.82

Wide Converter Lens

SECOND NUMERICAL EXAMPLE

| Numerical Values 2 | | | |
|---|---|---|---|
| r1 = −152.989 | d1 = 1.20 | n1 = 1.563839 | v1 = 60.7 |
| r2 = 20.755 | d2 = 3.88 | | |
| r3 = 102.745 | d3 = 2.17 | n2 = 1.805181 | v2 = 25.4 |
| r4 = −53.656 | d4 = 1.09 | | |
| r5 = −37.844 | d5 = 1.47 | n3 = 1.805181 | v3 = 25.4 |
| r6 = 129.833 | d6 = 0.21 | | |
| r7 = 28.975 | d7 = 2.64 | n4 = 1.517417 | v4 = 52.4 |
| r8 = −40.831 | | | |

AFOCAL MAGNIFICATION 0.82

Wide Converter Lens

THIRD NUMERICAL EXAMPLE

| Numerical Values 3 | | | |
|---|---|---|---|
| r1 = −116.645 | d1 = 1.20 | n1 = 1.516800 | v1 = 64.2 |
| r2 = 20.509 | d2 = 3.86 | | |
| r3 = 134.913 | d3 = 2.17 | n2 = 1.805181 | v2 = 25.4 |
| r4 = −56.831 | d4 = 0.99 | | |
| r5 = −41.435 | d5 = 1.47 | n3 = 1.805181 | v3 = 25.4 |
| r6 = 130.742 | d6 = 0.27 | | |
| r7 = 29.577 | d7 = 2.64 | n4 = 1.517417 | v4 = 52.4 |
| r8 = −40.495 | | | |

AFOCAL MAGNIFICATION 0.82

Wide Converter Lens

FOURTH NUMERICAL EXAMPLE

| Numerical Values 4 | | | |
|---|---|---|---|
| r1 = −83.537 | d1 = 1.37 | n1 = 1.516330 | v1 = 64.1 |
| r2 = 22.393 | d2 = 3.70 | | |
| r3 = 194.908 | d3 = 2.19 | n2 = 1.784723 | v2 = 25.7 |
| r4 = −44.315 | d4 = 2.54 | | |
| r5 = −39.055 | d5 = 0.87 | n3 = 1.755199 | v3 = 27.5 |
| r6 = 110.538 | d6 = 0.50 | | |
| r7 = 30.262 | d7 = 2.93 | n4 = 1.516330 | v4 = 64.1 |
| r8 = −42.793 | | | |

AFOCAL MAGNIFICATION 0.82

Main Lens System

NUMERICAL EXAMPLE

| Numerical Values 5 f = 1~19.78 Fno = 1.66~2.69 2ω = 69.2°~4.0° | | | |
|---|---|---|---|
| r1 = 145.029 | d1 = 0.59 | n1 = 1.806100 | v1 = 33.3 |
| r2 = 13.200 | d2 = 2.25 | n2 = 1.496999 | v2 = 81.5 |
| r3 = −39.556 | d3 = 0.06 | | |
| r4 = 14.399 | d4 = 1.42 | n3 = 1.433870 | v3 = 95.1 |
| r5 = −269.717 | d5 = 1.04 | | |
| r6 = 9.579 | d6 = 1.03 | n4 = 1.712995 | v4 = 53.9 |
| r7 = 26.014 | d7 = VARIABLE | | |
| r8 = 16.471 | d8 = 0.23 | n5 = 1.882997 | v5 = 40.8 |
| r9 = 2.062 | d9 = 1.08 | | |

-continued

| | | | |
|---|---|---|---|
| r10 = −6.377 | d10 = 0.20 | n6 = 1.834807 | ν6 = 42.7 |
| r11 = 9.296 | d11 = 0.04 | | |
| r12 = 4.687 | d12 = 0.58 | n7 = 1.922860 | ν7 = 18.9 |
| r13 = −45.267 | d13 = 0.18 | n8 = 1.882997 | ν8 = 40.8 |
| r14 = 45.267 | d14 = VARIABLE | | |
| r15 = STOP | d15 = 1.55 | | |
| r16 = −5.755 | d16 = 0.17 | n9 = 1.834807 | ν9 = 42.7 |
| r17 = 8.801 | d17 = 0.55 | n10 = 1.805181 | ν10 = 25.4 |
| r18 = −8.801 | d18 = 0.11 | | |
| *r19 = 4.030 | d19 = 0.97 | n11 = 1.583126 | ν11 = 59.4 |
| r20 = −6.540 | d20 = 0.18 | n12 = 1.762001 | ν12 = 40.1 |
| r21 = 6.540 | d21 = 0.24 | | |
| r22 = 73.760 | d22 = 0.46 | n13 = 1.622992 | ν13 = 58.2 |
| r23 = −6.726 | d23 = VARIABLE | | |
| r24 = 12.643 | d24 = 0.45 | n14 = 1.696797 | ν14 = 55.5 |
| r25 = −12.643 | d25 = 0.44 | | |
| r26 = 5.586 | d26 = 0.18 | n15 = 1.846660 | ν15 = 23.9 |
| r27 = 2.529 | d27 = 0.96 | n16 = 1.696797 | ν16 = 55.5 |
| r28 = 26.884 | d28 = VARIABLE | | |
| r29 = ∞ | d29 = 4.32 | n17 = 1.589130 | ν17 = 61.1 |
| r30 = ∞ | d30 = 0.81 | n18 = 1.516330 | ν18 = 64.1 |
| r31 = ∞ | | | |

ASPHERICAL CONSTANT

| | |
|---|---|
| 19TH SURFACE | k = −1.32942e+00, A' = 0, B = 5.70542e−05, B' = 0, C = 8.35356e−05 C' = 0, D = −1.07854e−05, D' = 0, E = 1.02316e−06, E' = 0 F = 1.11138e−07 |

Numerical Values 6

| VARIABLE | FOCAL LENGTH | | |
|---|---|---|---|
| DISTANCE | 1 | 6.5 | 19.8 |
| D7 | 0.17 | 7.37 | 9.40 |
| D14 | 9.85 | 2.65 | 0.62 |
| D23 | 2.15 | 1.33 | 2.62 |
| D28 | 0.87 | 1.70 | 0.41 |

TABLE 1

| CONDITIONAL FORMULA | 1ST NUMERICAL EXAMPLE | 2ND NUMERICAL EXAMPLE | 3RD NUMERICAL EXAMPLE | 4TH NUMERICAL EXAMPLE |
|---|---|---|---|---|
| (1) | 1.18 | 1.31 | 1.43 | 1.73 |
| (2) | −30.4 | −29.5 | −34.0 | −13.4 |
| (3) | 1.589 | 1.564 | 1.517 | 1.517 |

In the above embodiments, a converter lens is described, which has four lens elements arranged in the following order from the object side: a negative lens element, a positive lens element, a negative lens element, and a positive lens element. However, the configuration of the converter lens is not limited to that described above. For example, a fifth lens element having negative refractive power may be disposed between the first lens element and the second lens element, such that the lens elements are arranged in the following order from the object side: a first lens element, a fifth lens element, a second lens element, a third lens element, and a fourth lens element. In that case, the refractive power of the fifth lens element may alternatively be positive.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-201772 filed Jul. 25, 2006, which is hereby incorporated by reference herein in its entirety.

What is claimed is:

1. A wide converter lens attached to an object side of a main lens system, comprising:

a first lens element having negative refractive power, the first lens element being disposed on the most object side and whose object-side surface is concave; and a second lens element having positive refractive power and a third lens element having negative refractive power, the second and third lens elements being disposed at an image side of the first lens element, wherein the following conditions are satisfied:

$$1.0 < (r1-r2)/(r1+r2) < 2.0$$

$$-40 < f1/D < -7,$$

wherein (r1) and (r2) respectively represent curvature radii of the object-side surface and an image-side surface of the first lens element, (f1) represents a focal length of the first lens element, and (D) represents a spatial distance between the second lens element and the third lens element.

2. The wide converter lens according to claim 1, wherein the following condition is satisfied:

$$1.5 < N_{d1} < 1.6,$$

wherein ($N_{d1}$) represents a refractive index of a material of the first lens element.

3. The wide converter lens according to claim 1, wherein the first lens element, the second lens element, and the third lens element are disposed successively in that order from the object side.

4. The wide converter lens according to claim 1, further comprising a fourth lens element having positive refractive power, wherein the first lens element, the second lens element, the third lens element, and the fourth lens element are disposed in that order from the object side.

5. The wide converter lens according to claim 1, further comprising a fifth lens element disposed between the first lens element and the second lens element.

6. A wide converter lens attached to an object side of a main lens system, comprising:

a first negative lens element whose object-side surface is concave;

a second positive lens element having opposing convex surfaces;

a third negative lens element having opposing concave surfaces; and a fourth positive lens element having opposing convex surfaces, wherein the first to fourth lens elements are disposed in that order from the object side towards an image side,
wherein the following conditions are satisfied:

$$1.0 < (r1-r2)/(r1+r2) < 2.0$$

$$-40 < f1/D < -7,$$

wherein (r1) and (r2) respectively represent curvature radii of the object-side surface and an image-side surface of the first lens element, (f1) represents a focal length of the first lens element, and (D) represents a spatial distance between the second lens element and the third lens element.

7. The wide converter lens according to claim 6, wherein the following condition is satisfied:

$$1.5 < N_{d1} < 1.6,$$

wherein ($N_{d1}$) represents a refractive index of a material of the first lens element.

8. The wide converter lens according to claim 1, wherein the wide converter lens is attachable to the object side of an imaging lens included in an image pickup apparatus, the image pickup apparatus further including a solid-state image pickup element that optically receives an image formed by the imaging lens.

9. The wide converter lens according to claim 6, wherein the wide converter lens is attachable to the object side of an imaging lens included in an image pickup apparatus, the image pickup apparatus further including a solid-state image pickup element that optically receives an image formed by the imaging lens.

10. An image pickup apparatus comprising:

an imaging lens;

the wide converter lens according to claim 1 attachable to the object side of the imaging lens; and a solid-state image pickup element that optically receives an image formed by the imaging lens having the wide converter lens attached thereto.

11. An image pickup apparatus comprising:

an imaging lens;

the wide converter lens according to claim 6 attachable to the object side of the imaging lens; and a solid-state image pickup element that optically receives an image formed by the imaging lens having the wide converter lens attached thereto.

* * * * *